United States Patent [19]

Alliston et al.

[11] Patent Number: 4,829,912

[45] Date of Patent: May 16, 1989

[54] METHOD FOR CONTROLLING THE PARTICULATE SIZE DISTRIBUTIONS OF THE SOLIDS INVENTORY IN A CIRCULATING FLUIDIZED BED REACTOR

[75] Inventors: Michael G. Alliston, Denville; Kenneth A. Reed, Califon, both of N.J.

[73] Assignee: Foster Wheeler Energy Corporation, Clinton, N.J.

[21] Appl. No.: 218,771

[22] Filed: Jul. 14, 1988

[51] Int. Cl.⁴ .................... F23G 5/00; F22B 1/00
[52] U.S. Cl. ................... 110/345; 432/58; 122/4 D; 110/245
[58] Field of Search .............. 110/245, 345; 122/4 D; 432/58

[56] References Cited

U.S. PATENT DOCUMENTS

| | | |
|---|---|---|
| 3,823,693 | 7/1974 | Bryers et al. . |
| 3,884,193 | 5/1975 | Bryers . |
| 3,888,193 | 6/1975 | Kishigami et al. .............. 110/245 |
| 3,893,426 | 7/1975 | Bryers . |
| 3,902,462 | 9/1975 | Bryers . |
| 3,905,336 | 9/1975 | Gamble et al. . |
| 4,061,112 | 12/1977 | Gibson . |
| 4,066,738 | 1/1978 | Daman . |
| 4,133,660 | 1/1979 | Steiner . |
| 4,154,197 | 5/1979 | Costello et al. . |
| 4,159,682 | 7/1979 | Fitch et al. .............. 110/245 |
| 4,177,741 | 12/1979 | Stewart et al. . |
| 4,184,455 | 1/1980 | Talmud et al. . |
| 4,227,488 | 10/1980 | Stewart et al. . |
| 4,235,327 | 4/1982 | Kantesaria et al. .............. 110/245 |
| 4,248,179 | 2/1981 | Bonner . |
| 4,249,470 | 2/1981 | Vatsky . |
| 4,250,839 | 2/1981 | Daman . |
| 4,324,544 | 4/1982 | Blake .............. 432/14 |
| 4,349,969 | 9/1982 | Stewart et al. . |
| 4,430,094 | 2/1984 | Gorzegno . |
| 4,565,139 | 1/1986 | Sage et al. .............. 110/245 |
| 4,594,967 | 6/1986 | Wolowodiuk . |
| 4,616,576 | 10/1986 | Engstrom et al. .............. 110/245 |
| 4,617,877 | 10/1986 | Gamble . |
| 4,665,864 | 5/1987 | Seshamani et al. . |
| 4,682,567 | 7/1987 | Garcia-Mallol et al. . |

Primary Examiner—Henry C. Yuen
Attorney, Agent, or Firm—Marvin A. Naigur; Warren Kice

[57] ABSTRACT

A method of controlling the particle size distribution in a fluidized bed reactor in which a primary bed of particulate material having a varying size and including fuel is established. Air is introduced into the bed to fluidize the material and promote the combustion of the fuel. A portion of the particulate material is discharged from the bed and into a secondary bed. Air is introduced to the secondary bed at a velocity sufficient to fluidize the particulate material and entrain some of the finer portions of the particulate material. The air and the entrained finer material from the secondary bed are passed back to the primary bed and the velocity of the air introduced to the secondary bed is varied to vary the amount of the finer material that is entrained and thus control the size of the material in the primary bed.

1 Claim, 1 Drawing Sheet

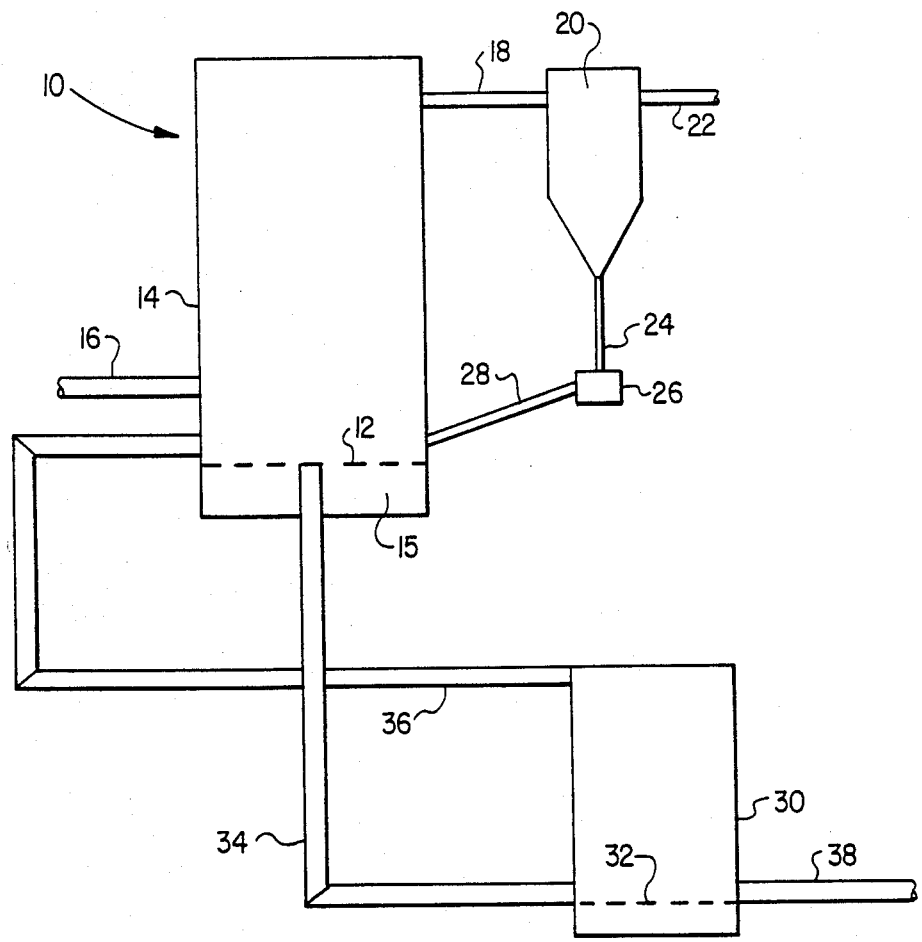

4,829,912

METHOD FOR CONTROLLING THE PARTICULATE SIZE DISTRIBUTIONS OF THE SOLIDS INVENTORY IN A CIRCULATING FLUIDIZED BED REACTOR

BACKGROUND OF THE INVENTION

This invention relates to a method for controlling the operation of a fluidized bed reactor and, more particularly, to such a method in which the particulate size distribution of the particulate solids inventory in a circulating fluidized bed reactor is controlled.

Fluidized bed reactors are well-known and are operated by passing air through a bed of particulate material including a fossil fuel, such as coal, and an absorbent for the sulfur generated as a result of combustion of the coal, to fluidize the bed and to promote the combustion of the fuel at relatively low temperatures.

The most typical fluidized bed combustion utilizes what is called a "bubbling" fluidized bed in which a bed of particulate material including fuel and an adsorbent for the sulfur generated as a result of combustion of the fuel, is supported on an air distribution plate through which combustion supporting air is introduced to expand the material and cause it to take on a suspended or fluidized state.

In an effort to extend the improvements in combustion efficiency, pollutants emissions control, and operation turn down, a "circulating" fluidized bed has evolved in which relatively low fluidized bed densities are utilized when compared to those of a bubbling fluidized bed. These low densities are achieved by utilizing relatively small-sized particles and a high solids circulation. This renders the bed insensitive to fuel heat release patterns and thus minimizes the variation of the temperatures within the reactor. The resulting increase in the residence time of the adsorbent and fuel particles reduces the adsorbent and fuel consumption and results in an improved turn-down when compared to the bubbling fluidized bed.

In these circulating beds it is an advantage to be able to control the size distribution of the particulate material in the fluidized bed. Once the solid material is fed to the fluidized bed, the control of the particulate size distribution must be achieved indirectly, through a controllable system parameter that affects the particulate size distribution. Since most of the system parameters that have an effect upon the inventory of the particulate material are predetermined by systems requirements, a sufficiently flexible operating parameter must be found in the system or added to the system. The behavior of solid particles may be understood by dividing the size distribution into three groups: fine, intermediate, and coarse particles. The relatively fine particles will generally bypass the separator while the relatively coarse particles will e discharge via the bed drain. The intermediate size particles will tend to build up in the bed with the coarse particles until the size distribution of the particulate material is equal to the distribution required to drain the intermediate particles with the coarse particles. Controlling the bed size distribution would involve making the bed distribution different from the required drain material distribution. Therefore, the essential problem in controlling the particulate size distribution is to be able to dispose of both the relatively coarse and the relatively intermediate size material in such a way that the bed size distribution does not determine the size distribution of the material leaving.

SUMMARY OF THE INVENTION

It is therefore an object of the present invention to provide a method of controlling the particulate material distribution in a circulating fluidized bed reactor.

It is a further object of the present invention to provide a method of the above type in which the size distribution of the bed inventory is independent of the distribution of the drained material.

It is a further object of the present invention to provide a method of the above type in which a secondary fluidized bed is provided through which the drained material passes for stripping portions of the intermediate and fine material from the drained material.

It is a further object of the present invention to provide a method of the above type n which the stripped intermediate and fine materials from the secondary fluidized bed are passed back into the main reactor.

Toward the fulfillment of these and other objects a primary bed is established including particulate material having a varying size. Air is introduced into the bed to fluidize the material and promote the combustion of the fuel, and the relatively coarse material is discharged from the bed into a secondary bed. Air is introduced into the secondary bed at a velocity sufficient to fluidize the coarse material in the secondary bed and entrain a portion of the intermediate and fine material. The air and entrained intermediate and fine material is then passed from the secondary bed back to the primary bed. The velocity introduced to the secondary bed is varied to vary the amount of the intermediate and fine material that is entrained and thus control the size of the material in the primary bed.

DESCRIPTION OF THE DRAWINGS

The above brief description, as well as further objects, features and advantages of the present invention will be more fully appreciated by reference to the following detailed description of the presently preferred but nonetheless illustrative embodiments in accordance with the present invention when taken in conjunction with the accompanying drawing which is a schematic view of a fluidized bed reactor which is controlled in accordance with the method of the present invention.

DESCRIPTION OF THE PREFERRED EMBODIMENT

Referring to the drawing, the reference numeral 10 refers, in general, to a fluidized bed reactor having an air distribution grate 12 disposed in a vessel 14 and adapted to support a bed of particulate material having a varying size distribution and including fuel. A plenum 15 is defined in the vessel 14 below the grate 12 and receives air from an external source (not shown) at a velocity sufficient to fluidize the particulate material in the vessel and promote the combustion of the fuel. Additional fuel is introduced, via an inlet pipe 16, into the interior of the vessel where it is discharged into the fluidized bed. A mixture of the air and the gaseous products of combustion rise upwardly in the vessel 14 by convection and, in so doing, entrains some of the relatively fine particles in the fluidized bed before the mixture exits, via an outlet pipe 18, to a cyclone separator 20. The separator 20 functions in a conventional manner to separate the entrained solid particulate material from the mixture of air and gaseous products of combustion, with the mixture exiting, via an outlet pipe 22 to external equipment for further processing.

The separated particulate material falls into the lower portion of the separator 20 and is discharged, via a Pipe 24, to a pressure seal device 26 of a conventional design. The solids pass through the pressure seal device 26 and are discharged, via a pipe 28, back into the interior of the vessel 14 and into the fluidized bed.

An additional vessel 30 is provided in close Proximity to the vessel 14 and includes an air distribution grate 32. A drain pipe 34 connects the vessel 14 to the vessel 30, with the ends of the pipe registering with and opening in the grate 12 and extending just above the grate 32. Particulate material having a size distribution which forms the fluidized bed in the vessel 14 is discharged, via the pipe 34, from the vessel 14 to the vessel 30. Air from an external source (not shown) is introduced into the vessel 30 below the grate 32 and functions to fluidize the particulate material accumulating on the grate 32. The velocity of the air introduced through the plate 32 is carefully controlled so that a predetermined portion of the relatively fine particulate material is entrained by the air as it passes upwardly through the vessel 30.

An outlet pipe 36 extends from the upper portion of the vessel 30 to the lower portion of the vessel 14 to pass the entrained particulate material from the vessel 30 back to the vessel 14 where it is discharged into the fluidized bed in the latter vessel. An outlet conduit 38 extends from the vessel 30 for permitting discharge of the relatively coarse and any remaining relatively fine material from the latter vessel.

It is thus seen that, upon varying the fluidizing velocity of the air introduced into the vessel 30, the amount of relatively fine material entrained in the vessel 30 and passed back to the bed in the vessel 14 can be controlled. Thus, as the velocity of the air introduced into the vessel 30 is increased, the particle size in the fluidized bed in the vessel 14 would become relatively finer; while if the fluidizing velocity of the air introduced into the vessel 30 is decreased the particulate size distribution of the material in the vessel 14 would become coarser. As a result, the particle size distribution in the vessel 14 is controlled.

A latitude of modification, change and substitution is intended in the foregoing disclosure and in some instances some features of the invention will be employed without a corresponding use of other features. Accordingly, it is appropriate that the appended claims be construed broadly and in a manner consistent with the scope of the invention.

What is claimed is:

1. A method of controlling the particle size distribution in a fluidized bed reactor comprising the steps of establishing a primary bed of particulate material having a varying size and including fuel, introducing air into said primary bed to fluidize said material and promote the combustion of said fuel, adding additional particulate material including fuel to said primary bed, discharging a portion of said particulate material from said primary bed into a secondary bed, introducing air to said secondary bed at a velocity sufficient to fluidize said particulate material and entrain relatively fine portions of said particulate material, passing said air and said entrained relatively fine portions of said particulate material from said secondary bed to said primary bed, and varying the velocity of said air introduced to said secondary bed to vary the amount of said entrained relatively fine portions of said particulate material and thus control the size of the material in said primary bed.

* * * * *